US011673267B2

(12) United States Patent
Abdul-hadi et al.

(10) Patent No.: US 11,673,267 B2
(45) Date of Patent: Jun. 13, 2023

(54) ROBOT JOINT SPACE GRAPH PATH PLANNING AND MOVE EXECUTION

(71) Applicant: Applied Materials, Inc., Santa Clara, CA (US)

(72) Inventors: Omar Abdul-hadi, Santa Clara, CA (US); Adam Christopher Cranmer, Leander, TX (US); Gregory John Freeman, Austin, TX (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 17/963,081

(22) Filed: Oct. 10, 2022

(65) Prior Publication Data

US 2023/0032418 A1    Feb. 2, 2023

Related U.S. Application Data

(63) Continuation of application No. 16/948,573, filed on Sep. 23, 2020, now Pat. No. 11,498,213.

(51) Int. Cl.
*B25J 9/00* (2006.01)
*B25J 9/16* (2006.01)
(Continued)

(52) U.S. Cl.
CPC ............. *B25J 9/1664* (2013.01); *B25J 9/023* (2013.01); *B25J 9/10* (2013.01); *B25J 9/161* (2013.01);
(Continued)

(58) Field of Classification Search
CPC ... B25J 9/1664; B25J 9/023; B25J 9/10; B25J 9/161; B25J 9/1651; B25J 11/0095; B25J 17/02; G05B 2219/39361
See application file for complete search history.

(56) References Cited

U.S. PATENT DOCUMENTS 6,501,545 B2    12/2002  Komuro et al.
9,186,795 B1 *  11/2015  Edsinger ............. B25J 11/0065
(Continued)

FOREIGN PATENT DOCUMENTS

KR    10-2014-0063715    5/2014

OTHER PUBLICATIONS

PCT Notification of Transmittal of the International Search Report and the Written Opinion of the International Searching Authority for PCT Application No. PCT/US2021/051578, dated Dec. 27, 2021, 12 pages.

*Primary Examiner* — Ian Jen
(74) *Attorney, Agent, or Firm* — Lowenstein Sandler LLP

(57) ABSTRACT

A system includes a robot with a robot arm having multiple joints and an end effector to carry a substrate. A processing device is to build, with respect to a joint space for the multiple joints and the end effector, a graph of reachable positions and sub-paths between the reachable positions, wherein the reachable positions and the sub-paths satisfy Cartesian limits within the joint space. The processing device is to determine, by executing a graph optimization algorithm on the graph, multiple paths, each made up of a group of the sub-paths and having one of a shortest distance or a lowest cost between a start point and an end point of the end effector. The processing device is to select a path, of the multiple paths, through the graph that minimizes a move time of the end effector between the start point and the end point.

20 Claims, 9 Drawing Sheets

(51) Int. Cl.
    *B25J 17/02*         (2006.01)
    *B25J 11/00*         (2006.01)
    *B25J 9/10*          (2006.01)
    *B25J 9/02*          (2006.01)

(52) U.S. Cl.
    CPC ......... *B25J 9/1651* (2013.01); *B25J 11/0095* (2013.01); *B25J 17/02* (2013.01)

(56) References Cited

U.S. PATENT DOCUMENTS

| | | |
|---|---|---|
| 2018/0001472 A1 | 1/2018 | Konidaris et al. |
| 2019/0240835 A1 | 8/2019 | Sorin et al. |
| 2019/0327394 A1 | 10/2019 | Ramirez Luna et al. |
| 2020/0139547 A1 | 5/2020 | Fujieda et al. |

\* cited by examiner

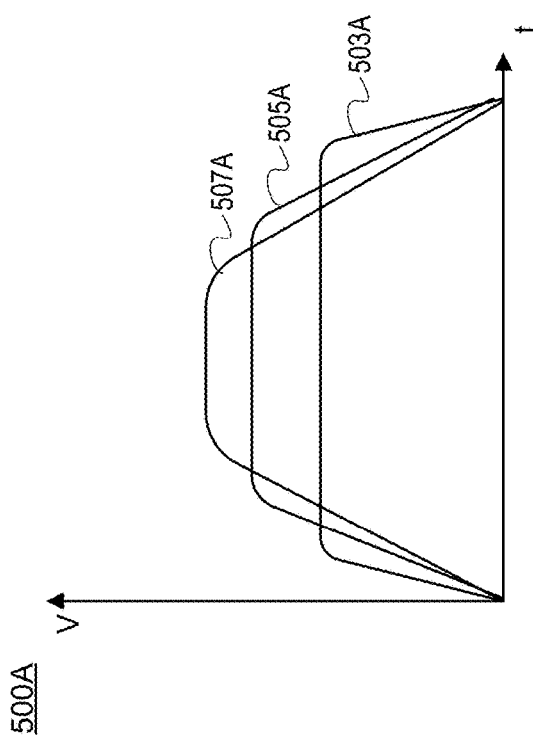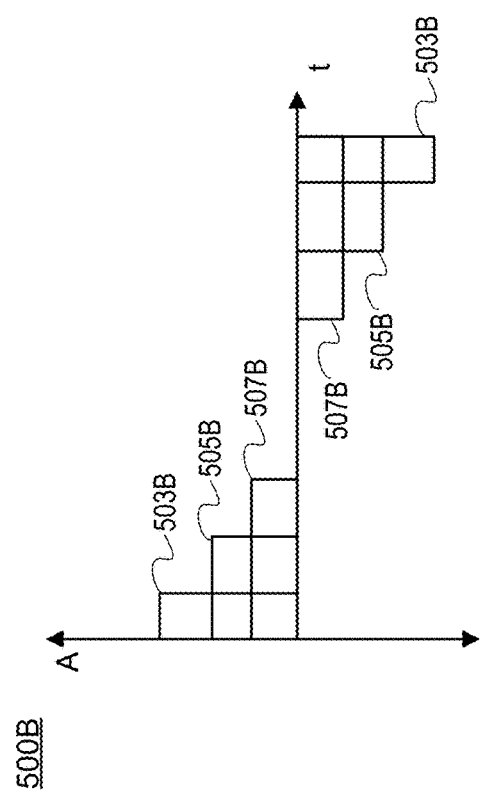

700A

```
┌─────────────────────────────────────────────────────────────────────────┐
│ Determine, within a joint space of a robot arm, a start point and an    │
│ end point of one or more end effector for a complete movement of the    │
│ robot arm to transfer a substrate lying on the one or more end          │
│ effector, the robot arm comprising multiple joints and the one or more  │
│ end effector. 710                                                       │
└─────────────────────────────────────────────────────────────────────────┘
                                    │
                                    ▼
┌─────────────────────────────────────────────────────────────────────────┐
│ Identify, from a grid of joint positions within joint ranges of the     │
│ multiple joints and using a first granularity, multiple reachable       │
│ positions by the multiple joints and the one or more end effector, the  │
│ grid being within the joint space and including the start point and    │
│ the end point. 715                                                      │
└─────────────────────────────────────────────────────────────────────────┘
                                    │
                                    ▼
┌─────────────────────────────────────────────────────────────────────────┐
│ Build a graph that includes nodes to represent the plurality of         │
│ reachable positions that also satisfy Cartesian limits of the robot     │
│ arm within the joint space. 720                                         │
└─────────────────────────────────────────────────────────────────────────┘
                                    │
                                    ▼
┌─────────────────────────────────────────────────────────────────────────┐
│ Adding, to the graph, edges that interpolate between nearest neighbor   │
│ nodes of the nodes that complete multiple paths between the start       │
│ point and the end point, wherein the edges also satisfy the Cartesian   │
│ limits. 725                                                             │
└─────────────────────────────────────────────────────────────────────────┘
                                    │
                                    ▼
┌─────────────────────────────────────────────────────────────────────────┐
│ Calculate distances of the edges of the graph. 730                      │
└─────────────────────────────────────────────────────────────────────────┘
                                    │
                                    ▼
┌─────────────────────────────────────────────────────────────────────────┐
│ Execute a graph optimization algorithm on the graph to determine one    │
│ of multiple shortest paths or lowest cost paths through the nodes       │
│ between the start point and the end point. 735                          │
└─────────────────────────────────────────────────────────────────────────┘
```

```
┌─────────────────────────────────────────────────────────────────────────┐
│ Select a path, of the multiple shortest paths, between the start point  │
│ and the end point that minimizes move time of the primary end effector  │
│ between the start point and the end point. 755                          │
└─────────────────────────────────────────────────────────────────────────┘
                                      ↓
┌─────────────────────────────────────────────────────────────────────────┐
│ Randomly vary velocity limits and acceleration limits for velocity      │
│ profiles of each move of a joint, of the multiple joints, between the   │
│ nearest neighbor nodes and through the multiple shortest paths. 760     │
└─────────────────────────────────────────────────────────────────────────┘
                                      ↓
┌─────────────────────────────────────────────────────────────────────────┐
│ Verify that torque limits on one or more motors that move the robot arm │
│ are satisfied in view of the velocity limits and the acceleration       │
│ limits that are varied. 765                                             │
└─────────────────────────────────────────────────────────────────────────┘
                                      ↓
┌─────────────────────────────────────────────────────────────────────────┐
│ Verify that a maximum acceleration limit of the one or more end         │
│ effector is satisfied. 770                                              │
└─────────────────────────────────────────────────────────────────────────┘
```

```
┌─────────────────────────────────────────────────────────────────────────┐
│ Determine, within a joint space of the robot arm, a start point and an end point of the │
│ one or more end effector for a complete movement of the robot arm to transfer the │
│ substrate. 810                                                          │
└─────────────────────────────────────────────────────────────────────────┘
                                    ↓
┌─────────────────────────────────────────────────────────────────────────┐
│ Build, with respect to the joint space for the multiple joints and the one or more end │
│ effector, a graph of reachable positions and sub-paths between the reachable │
│ positions, wherein the reachable positions and the sub-paths satisfy Cartesian limits │
│ within the joint space, and the reachable positions are identified at a granularity that │
│ divides the complete movement into multiple sub-movements of the robot arm. 815 │
└─────────────────────────────────────────────────────────────────────────┘
                                    ↓
┌─────────────────────────────────────────────────────────────────────────┐
│ Determine, by executing a graph optimization algorithm on the graph, multiple paths, │
│ each made up of a group of the sub-paths, that have one of shortest distances or │
│ lowest costs between the start point and the end point. 820             │
└─────────────────────────────────────────────────────────────────────────┘
                                    ↓
┌─────────────────────────────────────────────────────────────────────────┐
│ Select a path, of the multiple paths, through the graph that minimizes move time of the │
│ one or more end effector between the start point and the end point while satisfying │
│ torque limits on the multiple joints and an acceleration limit on the one or more end │
│ effector. 825                                                           │
└─────────────────────────────────────────────────────────────────────────┘
                                    ↓
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│         Direct the robot arm to transfer the substrate using the path            │
│                          through the joint space. 830                            │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

FIG. 8

ROBOT JOINT SPACE GRAPH PATH PLANNING AND MOVE EXECUTION

RELATED APPLICATIONS

The present application is a continuation of U.S. patent application Ser. No. 16/948,573, filed Sep. 23, 2020, which is incorporated by this reference herein.

TECHNICAL FIELD

Embodiments of the present disclosure relate to robot joint space graph planning and execution.

BACKGROUND

Servo controlled mechanisms are commonly used in the manufacturing industries, such as in robotics tools that are employed to automate manufacturing. In some cases, this manufacturing is a multi-step processing of semiconductor devices, in which the robotics tools include motors attached to robot linkages that move semiconductor substrates from step to step of degas (or clean), deposition, and etch processes. The robot linkages, for example, can be arms and end effectors of a robot used for substrate transfer within a factory interface and transfer chamber and the like. The robot linkages can also include one more pulley belt that facilitates transfer of torque between the motor and the arm or other robot linkage.

Many of the robot tools in semiconductor wafer handling are constrained to work in very small operational space. If motion is not carefully planned, one of multiple joints or an end effector (that carries a substrate or wafer) of a robot linkage can be run into the Cartesian limits of the robot. Cartesian limits are motion constraints defined by, for example, obstacles such as walls and other objects in the environment of the robot, including other robots or moving parts thereof, that are to be avoided during movements of the robot while transferring substrates from one location to another. Conventionally, the paths of the robot linkages are planned manually in a way that avoids the Cartesian limits. This is time-consuming and increasingly difficult to do manually in confined space with multiple complicated movements. Furthermore, manual path planning must be repeated each time there is an update to the environment, such as a new obstacle, a processing chamber is added, or other chamber or intermediate station is added that requires the robot to make additional moves within the confined space.

SUMMARY

Some of the embodiments described herein cover a system that includes a robot including a robot arm having multiple joints and one or more end effector, the one or more end effector to carry a substrate. A processing device is coupled to the robot. The processing device builds, with respect to a joint space for the multiple joints and the one or more end effector, a graph of reachable positions and sub-paths between the reachable positions, wherein the reachable positions and the sub-paths satisfy Cartesian limits within the joint space. The processing device determines, by executing a graph optimization algorithm on the graph, multiple paths, each made up of a group of the sub-paths and having one of a shortest distance or a lowest cost between a start point and an end point of the one or more end effectors. The processing device selects a path, of the multiple paths, through the graph that minimizes move time of the one or more end effector between the start point and the end point.

In related embodiments, described herein is a method building, with respect to a joint space for multiple joints and one or more end effector of a robot arm, a graph of reachable positions and sub-paths between the reachable positions, wherein the reachable positions and the sub-paths satisfy Cartesian limits within the joint space. The method further includes determining multiple paths through the graph by executing, with a processing device, a graph optimization algorithm on the graph, wherein each path of the multiple paths include a group of the sub-paths and has one of a shortest distance or a lowest cost between a start point and an end point of the one or more end effector. The method further includes selecting a path, of the multiple paths, through the graph that minimizes a move time of the one or more end effector between the start point and the end point.

In a further embodiment for a non-transitory computer-readable storage medium that stores instructions, which when executed by a processing device, cause the processing device to perform a plurality of operations. The plurality of operations include building, with respect to a joint space for multiple joints and one or more end effector of a robot arm, a graph of reachable positions and sub-paths between the reachable positions, wherein the reachable positions and the sub-paths satisfy Cartesian limits within the joint space. The plurality of operations further include determining multiple paths through the graph by executing a graph optimization algorithm on the graph, wherein each path of the multiple paths includes a group of the sub-paths and has one of a shortest distance or a lowest cost between a start point and an end point of the one or more end effector. The plurality of operations further include selecting a path, of the multiple paths, through the graph that minimizes a move time of the one or more end effector between the start point and the end point.

Numerous other features are provided in accordance with these and other embodiments of the disclosure. Other features and embodiments of the present disclosure will become more fully apparent from the following detailed description, the claims, and the accompanying drawings.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIG. 5A is an example plot of different trapezoidal velocity profiles for three joints of a robot arm according to an embodiment.

FIG. 5B is an example plot of different acceleration profiles that correspond to the trapezoidal velocity profiles (FIG. 5A) of the three joints of the robot arm according to an embodiment.

FIG. 7A is a flow chart of a method for determining shortest paths through robot joint space in which multiple joints and one or more end effector satisfy Cartesian limits, according to various embodiment.

FIG. 7B is a flow chart of a method for determining over which of the shortest paths (FIG. 7A) that move time can be minimized according to various embodiments.

FIG. 8 is a flow chart of a method of planning and executing a movement of a robot arm over a path through robot joint space that satisfies Cartesian limits and minimizes move time according to various embodiments.

DETAILED DESCRIPTION OF EMBODIMENTS

Figure 1:
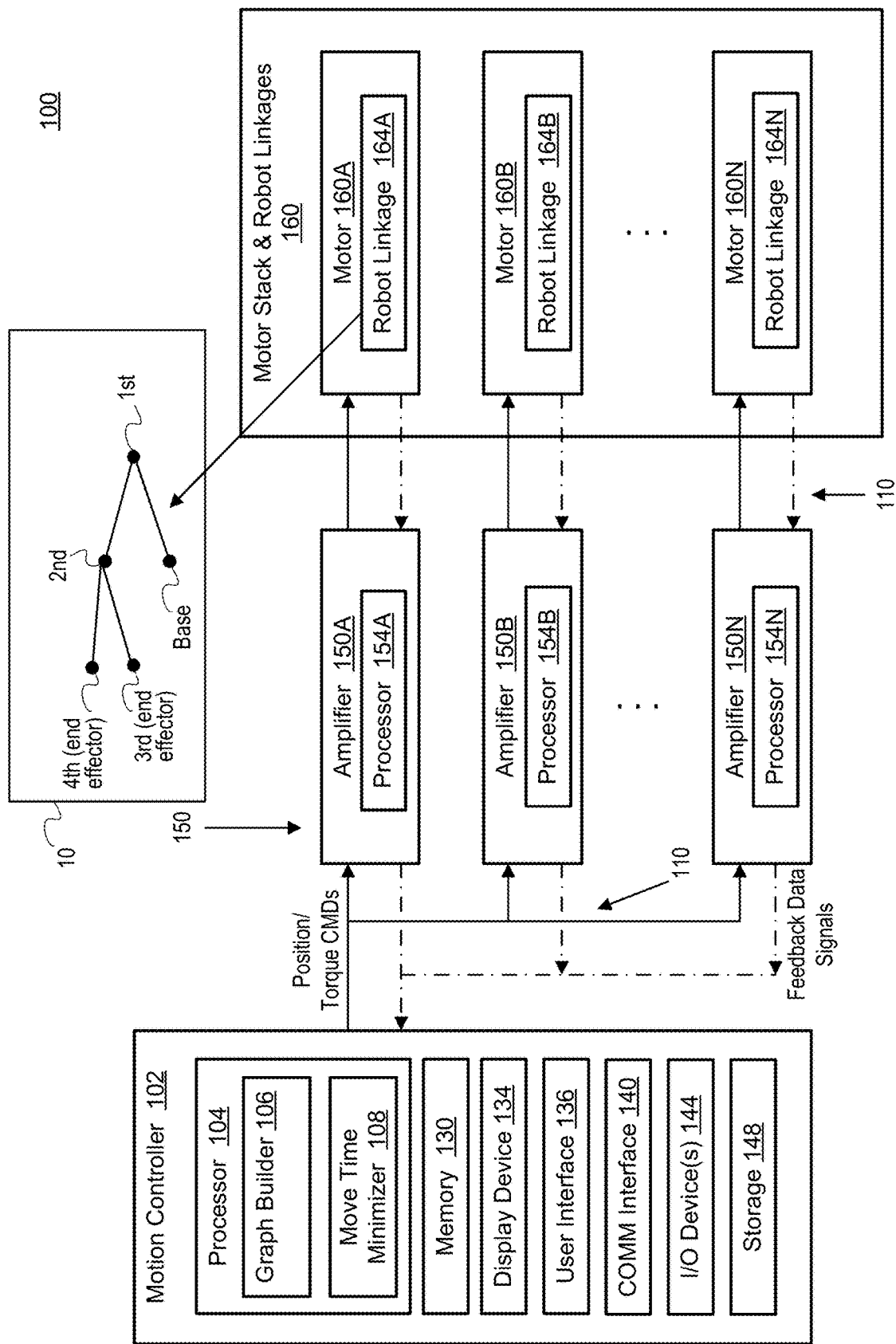
FIG. 1 is a block diagram of a control system that includes a motion controller coupled to multiple amplifiers that serve to actuate corresponding motors and robot linkages according to various embodiments.

Embodiments described herein are related to systems and methods for use in planning and executing a movement of a robot linkage over a path through robot joint space that satisfies Cartesian limits and minimizes move time. For example, a processing device (e.g., a computing system) with access to joint space of a robot along with Cartesian limits within the joint space can plan a path for a robot linkage between a start point and an end point. Joint space is the coordinate frame by which robot linkages (including joints) are controlled and does not extend beyond joint limits. Thus, joint space can extend into motor space, making reference to extension limits of motors that actuate the robot linkages, e.g., directly or through an indirect mechanical transmission. Further, while joint space may be a primary degree-of-freedom space, envisioned also are linear (e.g., gearbox) and non-linear (e.g., 4-bar, slider-crank, and the like) transmission elements positioned between kinematic joint space and a robot linkage actuator or motor. Cartesian limits are defined by, for example, obstacles such as walls and other objects in the environment of the robot that are to be avoided during movements of the robot while transferring substrates from one location to another. For simplicity of explanation, the robot linkage can include multiple joints and one or more end effectors for carrying a substrate (or wafer) positioned thereon.

In various embodiments, the robot joints can include prismatic joints and/or revolute joints. A prismatic joint is a connection between two objects that allows relative motion along a single axis, and thus enable linear motion. Motion that is perpendicular to this axis (or rotation about any axis) is prevented. A revolute joint, also called a pin joint of a hinge joint, is a one-degree-of-freedom kinematic pair. The revolute joint constrains the motion of two bodies to pure rotation along a common axis. When a robot linkage interpolates between two points, planned movement may be performed by either or a combination of prismatic joints and revolute joints to complete the path.

Planning the path in advance enables the robot to execute a movement to transfer the substrate consistently and safely many times over the same path without running some part of the robot arm into a wall or other obstacle that violates the Cartesian limits. If the path is planned by merely by linearly interpolating between the start point and the end point, the path can easily end up moving into areas of the joint space that violate the Cartesian limits.

According to various embodiments, therefore, the present systems and methods plan a path that includes a number of sub-paths (or partitions of a complete path), each of which is cleared of the Cartesian limits and complies with joint limits. The planning process for a complete movement can be performed within at least two phases. A first phase can include building a graph in which nodes of the graph represent reachable positions of the multiple joints and the end effector. While for simplicity of explanation, this disclosure may refer to "an end effector," it should be understood that the robot arm can have more than one end effector and the planned path can incorporate one or more end effector, each represented as a node in the graph. Multiple end effectors can include a primary end effector that is actively carrying a substrate and for which the planned path is focused and one or more passive end effectors that may or may not be carrying a substrate, but for which the particular planned path is not the focus. Further, ultimately determined optimized paths can include satisfying workspace and/or acceleration constraints on passive end effectors and the primary end effector while minimizing move time for the primary end effector of multiple end effectors attached to a robot arm.

In some embodiments, the reachable positions are identified within a grid of the joint space between the start point and the end point, and be focused on the primary end effector. Each reachable position is verified to satisfy both joint limits and Cartesian limits. The reachable positions can be identified at a granularity that divides a complete path into a group of sub-paths, e.g., that also divides the complete movement into multiple sub-movements of the robot arm over the complete path. In various embodiments, the joint limits can include movement parameters such as torque, velocity, acceleration, jerk, range of motion, and reaction force and moment limits on structural degree-of-freedom limits. Further, the joint limits and Cartesian limits extend into and allow for non-linear shapes, curves, and objects. Thus, while examples of joint and Cartesian limits herein may appear more rectangular or straight, non-linear features are also envisioned and can be integrated into optimization of path planning via parameters such as position, torque, velocity, acceleration, jerk, range of motion, force interactions, and the like.

Also within the first phase, the systems and methods can further identify sub-paths between nearest neighbor nodes that also satisfy the Cartesian limits and are part of one of many complete paths between the start point and the end point. These sub-paths can be represented as edges within the graph. The processing device can measure distances of these edges and then execute a graph optimization algorithm on the graph to determine multiple paths, each made up of a group of the sub-paths, that have shortest distances between the start point and the end point. In this way, the processing device can optimize selection of the shortest paths through the joint space that also satisfies joint limits and Cartesian limits throughout the entirety of the paths. In various embodiments, different cost functions can be applied to measure shortest distance or lowest cost during graph optimization.

In different embodiments, the shortest path can found by minimizing a cost function other than Euclidian distance. Examples of cost functions can include weights that disadvantage paths that are slower and thus estimate the minimum time path. For example, cost functions could penalize path curvature, and thus increase a cost of penalized paths. By using different cost functions, the shortest paths closer approximate the shortest paths with the shortest move times.

Using different cost functions for graph optimization can improve computational efficiency of a second phase (discussed below) by reducing the number of multiple shortest paths to consider. Some embodiments can skip the seconds phase and directly compute shortest move time.

The term "satisfy" with respect to joint limits herein indicates that a combination of movements of the multiple joints is allowable in the sense that the multiple joints are allowed to articulate in such a combination of movements. The term "satisfy" with respect to Cartesian limits herein is used to indicate that a position or edge of a path within the graph does not overlap with excluded three-dimensional space defined by obstacles such as walls within an operating environment of the robot. Each of the joint limits and the Cartesian limits can be defined within a certain operating tolerances so that the parts of the robot arm (or other robot linkage) do not come close to the given limits. With respect to the Cartesian limits, for example, the tolerances can be within 1-2 cm or 10-20 mm, for example.

According to a second phase, the present systems and methods can select a first (e.g., fastest) path, of the multiple (shortest) paths, through the graph that minimizes move time of the primary end effector between the start point and the end point while also satisfying torque limits on the multiple joints and an acceleration limit on the one or more end effector. To do so, the processing device can randomly vary velocity limits and acceleration limits for velocity profiles (among other limits and profiles) of each move of a joint, of the multiple joints, between nearest neighbor reachable positions and through the multiple paths. The processing device can further verify that torque limits on one or more motors that move the robot arm are satisfied in view of the velocity limits and the acceleration limits that are varied and verify that a maximum acceleration limit of the end effector(s) is satisfied.

In this way, the present disclosure obviates the need to manually plan a safe path through the joint space and does so in a way that, because of computing processing of a multiple of the reachable positions and intervening subpaths, can ensure a path is chosen that is not only one of the shortest paths but also a path that minimizes move time, e.g., an optimal move path. For example, one of the given shortest paths may not be the most short of the shortest paths but still nonetheless has the shortest move time due to being able to have a higher average velocity and/or higher achievable accelerations.

Furthermore, the disclosed planning of complete movement paths saves significant time in being able to quickly re-identify and use new paths as design parameters change within the processing environment, such as, but not limited to, wafer station positions, robot number of links, robot number of end effectors, robot link lengths, masses, inertias, center of gravity, and pulley ratios. Further, by performing path planning as disclosed herein based on pre-calculated known safe paths back to a home position, when a robot is awoken in a position other than a home position, the processing device can quickly select one of several known safe paths, based on current positions of joints and that of the primary end effector, in order to return the robot arm to the home position, e.g., at the start point. Performing this homing position move, required before starting operation of a robot tool, is not a trivial problem for many robot tools.

FIG. 1 is a block diagram of a control system 100 that includes a motion controller coupled to multiple amplifiers that serve to actuate corresponding motors and robot linkages, according to various embodiments. More specifically, the control system 100 can include a motion controller 102 (or other processing device or computing system), a set of amplifiers 150, and a motor stack and robot linkages 160. The amplifiers 150 can be actuators to the motors as controlled by the motion controller 102.

The motor stack and robot linkages 160 can include multiple motors and robot linkages, e.g., a first motor 160A and a first robot linkage 164A, a second motor 160B and a second robot linkage 164B, and an Nth motor 160N and an Nth robot linkage 164N. In one embodiment, the robot linkages 164A, 164B . . . 16N are interconnected, and thus the multiple motors 160A, 160B . . . 160N can work in cooperation to move the robot linkages as directed by the motion controller 102 and according to feedback from the motors and robot linkages. There may not be a robot linkage per motor, therefore, where some of the motors can jointly couple to and move one or a combination of robot linkages, which can be both serial linkages and/or parallel linkages in different embodiments. In another embodiment, one or more of the motors 160A, 160B . . . 160N independently control at least some of the respective robot linkages, whether serial or parallel linkages.

In one embodiment, one of the robot linkages, e.g., such as the robot linkage 164A, is a robot arm having a base position that does not move ("base"), a first joint (e.g., elbow), a second joint (e.g., wrist), a third joint (e.g., primary end effector), and an optional fourth joint (e.g., passive end effector). Although three or four joints, where one or two are end effectors, may be referred to herein, a robot linkage with more or fewer joints is envisioned and is encompassed by the principles taught herein. For example, the robot arm can include two passive end effectors in addition to the primary end effector. The robot arm is located within a processing chamber or other space of operation in which is defined Cartesian limits 10. As discussed, Cartesian limits 10 are defined by obstacles such as walls and other objects in the environment of the robot that are to be avoided during movements of the robot while transferring substrates from one location to another. For example, failure to satisfy the Cartesian limits causes the robot arm to run into a physical object, which can damage the robot arm.

The amplifiers 150 can include a first amplifier 150A, a second amplifier 150B, and a Nth amplifier 150N, each including a respective processor 154A, 154B . . . 154N to execute commands (e.g., instructions) received from the motion controller 102. The control system 100 can include an amplifier for each motor, so that independent control of each motor is possible despite the fact that the motors can operate in cooperation in some embodiments. Each amplifier 150A, 150B . . . 150N can include firmware or other software code stored in a local memory sufficient to execute the command (or instructions) received from the motion controller 102. The amplifiers 150A, 150B . . . 150N can each be a proportional-integral-derivative (PID) controller, a PI controller, or a triple-loop controller, for example.

The control system 100 can further include a communication network 110 that is responsive and determinative enough to enable real-time feedback control between the motion controller 102, the amplifiers 150, and the motor stack and robot linkages 160. For example, the communication network 110 can include data update times of less than 1 millisecond and communication jitter of less than ten microseconds. Accordingly, the communication network 110 can be consistent with or similar to Ethernet for Control Automation Technology (EtherCAT).

The communication network 110 can further employ Controller Area Network open (CANopen) protocol or a similar master-slave communication model. Distributed motion networks in accordance with one or more embodiments can permit distributed motion planning while providing close coordination with instructions from the motion controller 102 (master). Software programs/firmware can be stored respectively in the motion controller 102 (master) and in the actuator drivers, here referred to as the amplifiers 150 (slaves). This can allow motion planning to be distributed among the master and slave(s) and reduces the burden on the master and the communication network 110 by reducing the amount of data transfer that can occur over the communication network. In some embodiments, when distributed planning is referred to, the processing device or system performing one or more of the methods herein can be performed by a combination of the motion controller 102 and one or more of the processors 154A, 154B . . . 154N located within the amplifiers 150A, 150B . . . 150N, respectively.

For example, a motion instruction with respect to gap calibration generated by the motion controller 102 (master) can initiate movement of the motor 160A between a first position (e.g., a safe starting position) and a second position (e.g., a target position beyond the expected contact position) within predefined constraints of velocity and acceleration. The motion instruction can be received by a motion planner internal to an actuator driver (slave) which, based on the motion instruction data, generates a motion profile precisely describing the motion of the first motor 160A on an instant by instant basis to control speed and acceleration changes, e.g., to limit "jerk," the first derivative of acceleration, the latter which can produce undesired wear or oscillations on the motor and attached components.

Accordingly, the commanded motion data need not be transmitted over the communication network 110, but only the higher-level motion command that initiates the motion planner in the actuator drivers. The distributed nature of motion planning frees up communication network traffic for transmitting real-time process data including motion feedback data (which can be between one sample per millisecond, one sample per 20 milliseconds, or some other sampling rate) from the amplifier 150A, the motor 160A, and/or robot linkage 164A to the motion controller 102 without reducing motion positioning performance. This distributed control also allows the motion controller 102 (master) to control multiple motors concurrently for gap calibration or other functions. The disclosed methods herein can therefore be performed in a motion control system having motion-planning capable actuator drivers in accordance with one or more embodiments.

In some embodiments, the motion controller 102 sends position commands and torque commands (e.g., feedforward torque commands) to the multiple amplifiers 150 to control the motors, and thus, the robot linkages. In order to provide real-time control, the motion controller 102 can further receive feedback data signals from the amplifiers 150 at each time step of multiple time steps according to a sampling rate and over a period of time. Each feedback data signal can include instantaneous torque values (of the motors) and instantaneous velocity and acceleration values (of the robot linkages), among other hardware parameter values, including force, strain, compression, friction, resonance, and/or position of at least one of the robot linkage(s).

In various embodiments, the motion controller 102 includes, but is not limited to, a processor 104 that includes hardware or executes instructions, including firmware, that includes a graph builder 106 to perform the first phase described herein and a move time minimizer 108 to perform the second phase herein with reference to robot linkage path planning and execution. In some embodiments, the graph builder 106 and the move time minimizer 108 are located on a separate computing device, such as a networked server, that performs the graph planning discussed herein based on joint space, which includes joint limits and Cartesian limits information associated with the robot tool, and then provides a completed path plan to the motion controller 102 to execute by way of sending commands to the motor stack and robot linkages 160.

The motion controller 102 can further include a memory 130 (volatile, non-volatile, or a combination thereof), e.g., in which to store instructions that are being executed by the processor 104. The memory 130 can further buffer an aggregate of the instantaneous torque values and the instantaneous hardware parameter values received by way of the feedback data signals from the motor stack and robot linkages 160. The motion controller 102 can further include a display device 134, such as a monitor, display screen, or the like, a user interface 136 that facilitates interaction between an operator within the display device 134, a communication interface 140, multiple input/output (I/O) device 144, and a storage device 148 (e.g., one or more disk drives and/or solid state drives that are non-transitory computer-readable medium storing instructions).

In embodiments, the communication interface 140 facilitates communication over the communication network 110 with the amplifiers 150A, which was discussed. The I/O devices 144 can include input devices such as a keyboard, mouse, touchpad, microphone, and the like, as well as output devices such as a speaker, the display device 134, a printer, or the like. The storage device 148 can store software, e.g., a non-transitory computer-readable storage medium that stores instructions, and act as permanent storage for the aggregate of instantaneous torque values and instantaneous hardware parameter values on which the graph builder 106 and the move time minimizer 108 is performed. The motion controller 102 can execute the instructions to perform one or more of the methodologies and/or embodiments described herein. When memory is referred to herein, it is to be understood to mean either or both of the memory 130 (e.g., main memory) or the storage device (e.g., non-volatile, long-term computer storage).

The motion controller 102 can be and/or include a computing device such as a personal computer, a server computer (e.g., a motion control server), a programmable logic controller (PLC), a microcontroller, and so on. The motion controller 102 can include one or more processing devices such as a microprocessor, central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device can also be one or more special-purpose processing devices such as an application specific integrated circuit (ASIC), a field programmable gate array (FPGA), a digital signal processor (DSP), network processor, or the like.

Figure 2:
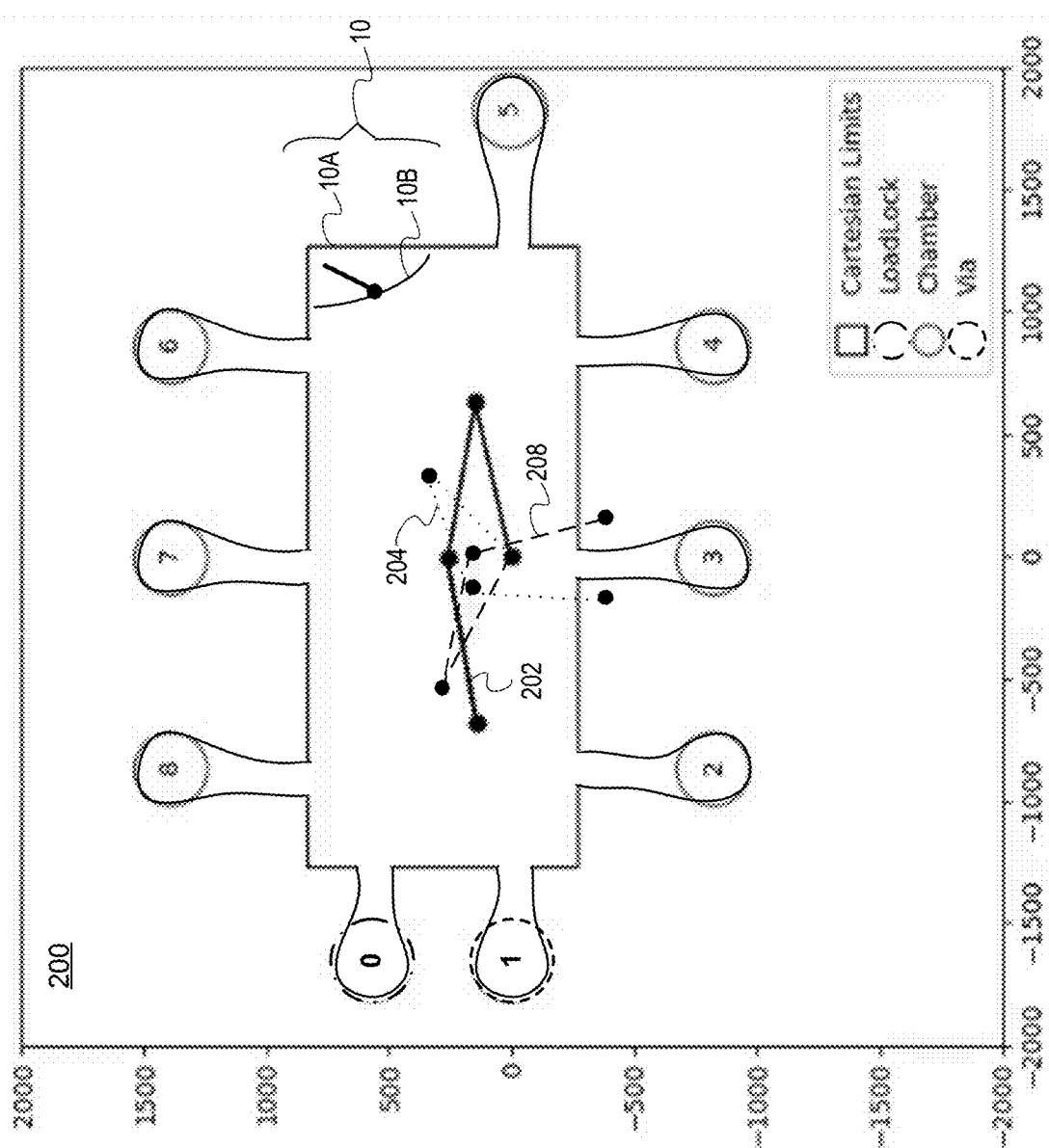
FIG. 2 is a model of a robot arm having multiple joints, including an end effector, that is planned for movement that violates Cartesian limits according to an embodiment.

FIG. 2 is a model 200 of a robot arm having multiple joints, including an end effector, that is planned for movement that violates Cartesian limits according to an embodiment. The robot arm can have an initial posture 202, which can be referred to as a home position in some cases. The robot arm can be constrained by the Cartesian limits 10 (FIG. 1), which are defined by static obstacles 10A and dynamic obstacles 10B surrounding the robot. For example, the static obstacles 10A can include a transfer chamber wall, the walls of a number of other chambers or rooms, such as a loadlock 0, a via 1, and multiple processing chambers 2-8 reachable by the robot arm, and passageways connecting these chambers. The dynamic obstacles 10B may be the moving parts of other machinery or robots, including a parallel operating robot linkage, that co-exist with the robot arm that generate an overlap in workspace. In various embodiments, the environment that makes up the space surrounding the robot (that includes the robot arm) can undergo on-the-fly reconfigurations, including the way that other robots or assemblies move that may require a redefining of the Cartesian limits 10 and thus also an update to the safe paths planned for the robot arm. Further, while a single end effector is referenced in some of the described Figures, it is for clarity of illustration, and it is to be understood that many embodiments will include one or more additional (or passive) end effector.

With reference to FIG. 2, the robot arm, when commanded to move for the initial posture 202 to a final posture, can pass through a number of intermediate positions, such that the multiple joints and end effector (see FIG. 1) also move through intermediate positions within joint space of the robot arm. If the motion controller 102 linearly interpolates a path directly between a start point of the initial posture 202 and an end point of the final posture, then that path can violate the Cartesian limits 10 if the path is not manually planned in order to avoid the Cartesian limits. For example, a first intermediate posture 204 in a first half of the complete movement violates the Cartesian limits and a second intermediate posture 208 in a second half of the complete movement also violates the Cartesian limits, e.g., the boundaries of the static obstacles 10A in this case. Thus, the path planning can be performed with greater granularity in defined intermediate postures, and thus intermediate reachable positions, in order to ensure satisfying the Cartesian limits.

Figure 3:
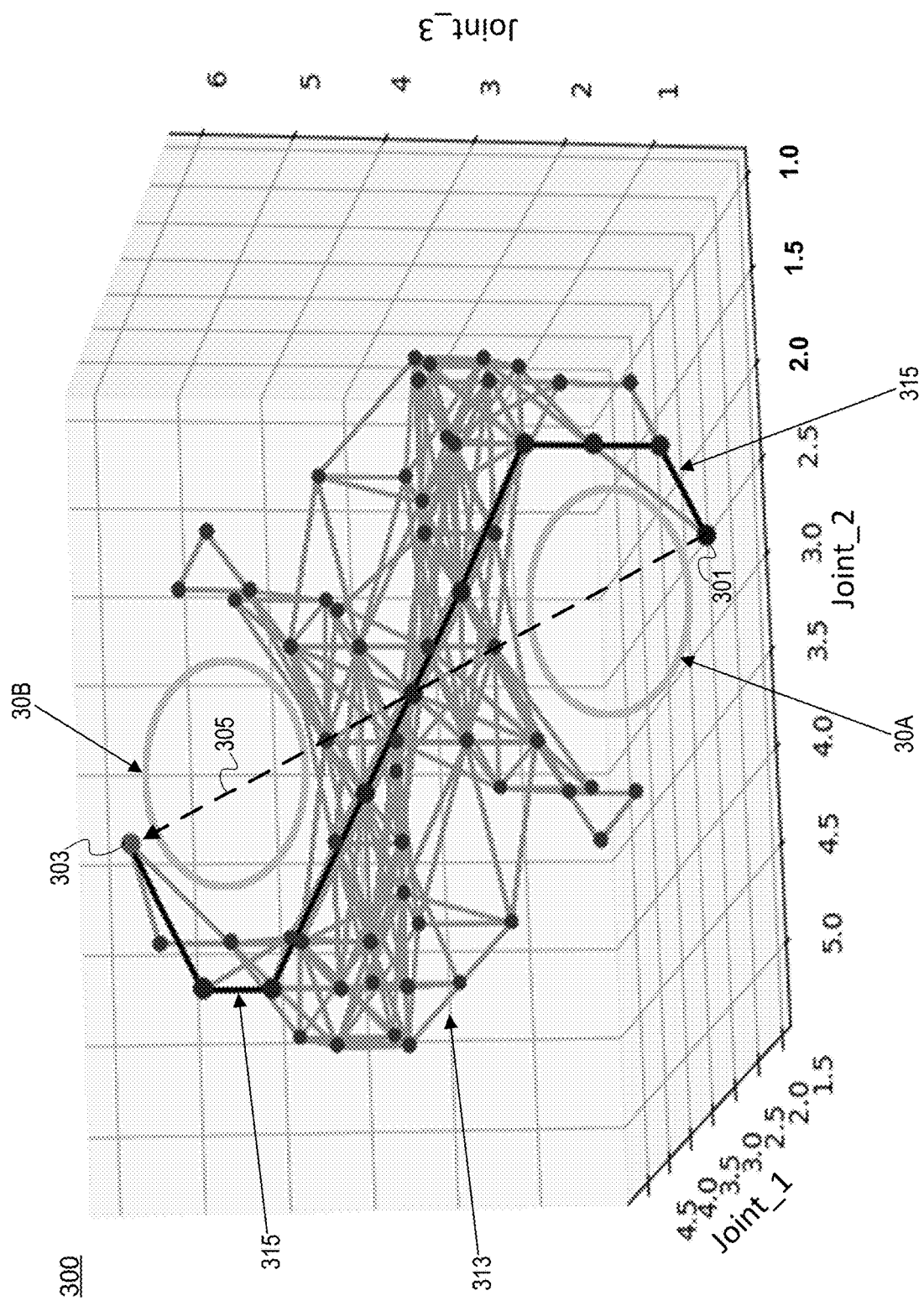
FIG. 3 is a graph of possible paths through joint space of three joints, one of which can be an end effector, while satisfying Cartesian limits according to an embodiment.

FIG. 3 is a graph 300 of possible paths through joint space of three joints, one of which can be an end effector, while satisfying Cartesian limits according to an embodiment. The graph 300 is in radians and illustrates joint 1 (e.g., an elbow) along a first axis (e.g., Y-axis), joint 2 (e.g., a wrist) along a second axis (e.g., X-axis), and joint 3 (e.g., an end effector) along a third axis (e.g., Z-axis). The graph 300 illustrates points within a grid that makes up joint space of the robot arm illustrated in FIGS. 1-2 and FIG. 4.

Joint space is different from conventional Cartesian coordinate space in encompassing, not only X, Y, and Z coordinates of three-dimensional space, but also rZ (also referred to as θ), which is an angle form the positive X-axis that defines a direction of movement of the end effector. The joint space of the graph 300 define areas of exclusion to the robot arm, such as areas of joint limits (e.g., possibly cut-out areas on the outside of the reachable positions) and one or more areas of Cartesian limits 10, such as a first area 30A and a second area 30B of Cartesian limits 10.

In the illustrated embodiments, for example, the joint space includes a start point 301 and an end point 303, which can be defined generally as the start and end points of the primary end effector. If simple linear interpolation is carried out between the start point 301 and the end point 303, a straight path 305 planned therebetween goes through the first area 30A and the second area 30B of the Cartesian limits 10. This path planning is insufficient because the Cartesian limits 10 of the robot arm are not satisfied.

In various embodiments, the motion controller 102 (e.g., the graph builder 106) identifies multiple reachable positions for the joints and one or more end effector, so some of the reachable positions can include one or more passive end effector. The term "reachable" indicates that the position satisfies joint limits for the joints of the robot arm. The multiple reachable positions can be identified at a granularity that divides the complete movement of the robot arm into multiple sub-movements. For example, within four to six radians of distance of a joint, the granularity of the reachable positions can be between 7 and 15 reachable positions (where illustrated are about 8 reachable positions). If too few reachable positions are identified for each path, there is a risk of missing a region where the planned path does not satisfy the Cartesian limits. If too many reachable positions are identified for each path, then computational time to build the graph, perform graph optimization, and later perform path optimization (discussed below) significantly increases.

The motion controller 102 (e.g., graph builder 106) can build a graph 313 that includes nodes (the dots on the graph that exclude the start point 301) to represent the reachable positions that also satisfy the Cartesian limits of the robot arm within the joint space based on joint combinations that lead to the reachable positions. The motion controller 102 can add edges to the graph that linearly interpolate between neatest neighbor nodes of the nodes that complete multiple paths between the start point 301 and the end point 303 and that also satisfy the Cartesian-limited areas 30A and 30B. As illustrated, the graph 313 of FIG. 3 contains a large number of these nodes and lines representing edges between each node and multiple nearest neighbor nodes of each respective node. In this way, the motion controller 102 can identify multiple paths through the nodes that enable the sub-movements of the joints and the end effector to complete the movement between the start point 301 and the end point 303.

Also with the first phase of the disclosed embodiments, the motion controller 102 can calculate distances of the edges of the graph, e.g., performed using the Euclidean norm between joint position values of the neatest neighbor nodes. The motion controller 102 can then execute a graph optimization algorithm (such as the Dijkstra graph algorithm, A* search algorithm, or other graph optimization algorithm) on the graph 313 to determine multiple shortest paths through the nodes between the start point 301 and the end point 303.

In various embodiments, the motion controller 102 can then select a path 315, of the multiple shortest paths, through the graph 313 that minimizes move time of the primary end effector between the start point 301 and the end point 303 while satisfying torque limits on the multiple joints and acceleration limits on the one or more end effector. This path 315 in the graph 313 of FIG. 3 is highlighted with a darker line to indicate the selected path. For example, one of the given shortest paths may not be the most short of the shortest paths but still nonetheless have the shortest move time due to being able to have a higher average velocity, higher joint torque values, and/or higher achievable accelerations at the end effector. Accordingly, the incorporation of dynamic or kinematic constraints (such as velocity, acceleration, and torque) in the path optimization analysis, enables the identification of the best of the shortest paths in order to avoid Cartesian limits and still minimize move time.

In some embodiments, the time required to perform graph optimization (or first phase) to identify the multiple shortest paths is on the order of seconds while the time required to perform path optimization to select the path 315 (in the second phase) is on the order of minutes. By reducing the paths to the shortest paths for analysis by the motion controller 102 in performing path optimization, the time can be significantly shortened that is required to perform the path optimization. Both graph and path optimization may be performed offline and before putting the robot into operation.

In additional embodiments, the memory controller 102 can also identify additional paths of the multiple (shortest) paths that minimize move time to additional end points. Then, in response to the robot waking up in other than a home position of the robot, the motion controller 102 can determine a location in the joint space of the end effector and determine a closest of the additional end points to the location. The motion controller 102 can then select an additional path, of the additional paths, based on the location and direct the robot arm to return to a home position via the selected additional path. In this way, the motion controller 102 can employ pre-planned safe and efficient paths to return the robot arm to the home position, e.g., at the start point 301.

Figure 4:
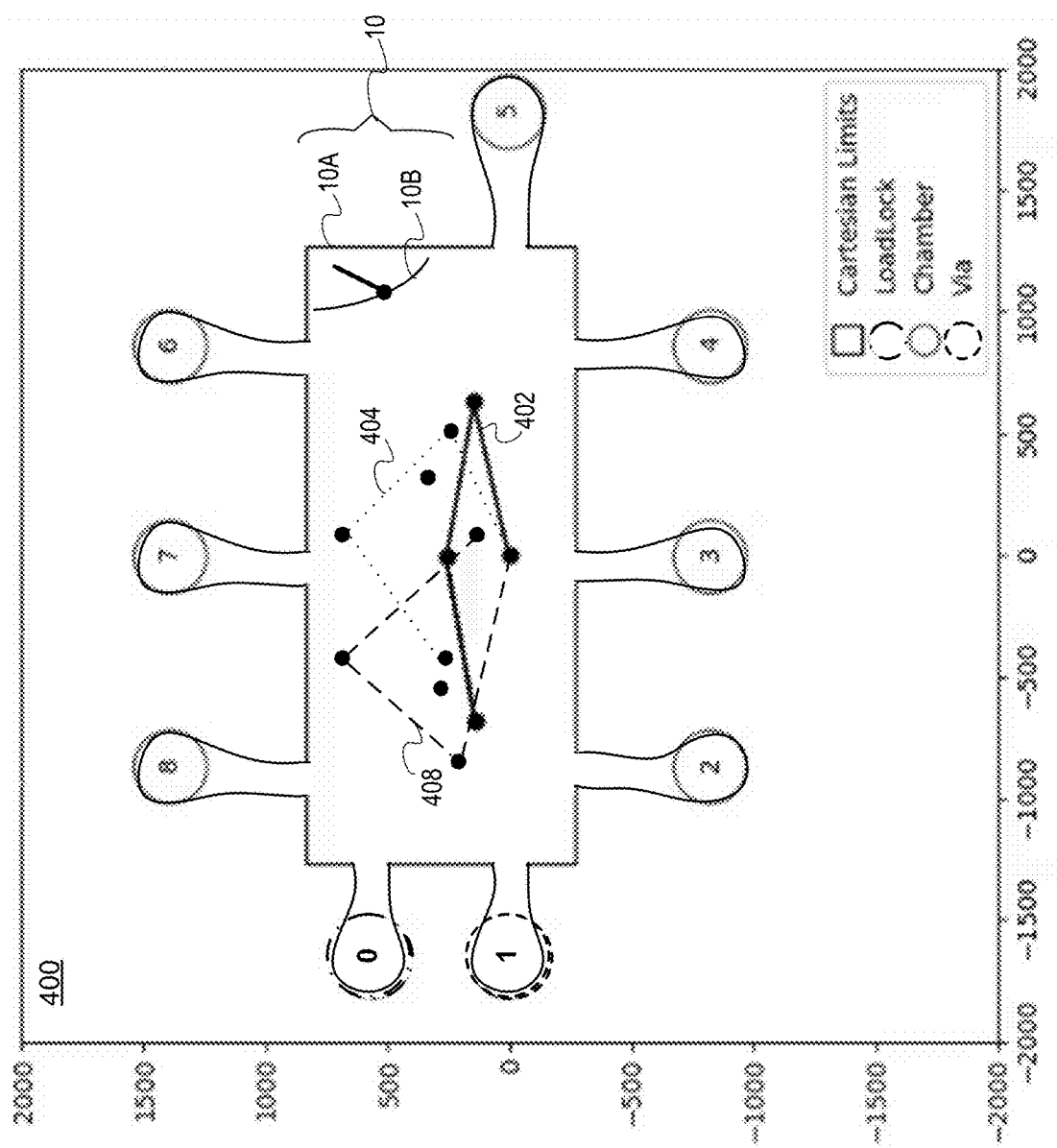
FIG. 4 is a model of a robot arm having multiple joints and an end effector that is planned for movement that satisfies Cartesian limits according to an embodiment.

FIG. 4 is a model 400 of a robot arm having multiple joints and an end effector that is planned for movement that satisfies Cartesian limits according to an embodiment. The model 400 of FIG. 4 is similar to the model 200 of FIG. 2, and has an initial posture 402 that is the same as the initial posture 202. Different from the model 200 of FIG. 2, however, the model 400 of FIG. 4 illustrates two intermediate postures, a first intermediate posture 404 in a first half of the complete movement of the robot arm and a second intermediate posture 408 in the second half of the complete movement of the robot arm. These two intermediate postures each satisfy the Cartesian limits 10 instead of violating them, and are located along the path 315 determined in the graph 313 of FIG. 3. Furthermore, all other intermediate postures (not shown for simplicity of illustration) along the path 315 likewise satisfy the Cartesian limits 10.

FIG. 5A is an example plot 500A of different trapezoidal velocity profiles for three joints of a robot arm according to an embodiment. The plot 500A plots velocity (y-axis) versus time (s-axis) for multiple joints of the robot arm. For example, joint 1 can have a first trapezoidal velocity profile 503A, joint 2 can have a second trapezoidal velocity profile 505A, and joint 3 (the end effector) can have a third trapezoidal velocity profile 507A, each varying in some degree as per planned control of the three joints. If the edges of these trapezoidal velocity profiles (e.g., a beginning and ending of the join movements) do not line up, then the robot arm does not move in a straight line. Accordingly, the variation of the velocity limits for different joints can cause an edge of the graph 313 to move into Cartesian limits that might not otherwise do so, or an edge that might move into Cartesian limits not do so due to such non-linear movement. Accordingly, path optimization performed by variation of dynamic criteria can also be performed in view of the Cartesian limits. In some embodiments, however, inclusion of tolerances within the Cartesian limit checks can resolve this issue and not separate further check of the Cartesian limits may be needed.

FIG. 5B is an example plot 500B of different acceleration profiles that correspond to the trapezoidal velocity profiles (FIG. 5A) of the three joints of the robot arm according to an embodiment. The plot 500B plots acceleration (y-axis) versus time (x-axis) of the end effector. Note the initial acceleration to get the movement going followed by constant velocity and ending with final deceleration to bring the robot arm to a stop. The step-based shape of the acceleration and deceleration can vary more in reality, and thus have a more curved shape, but are illustrated in this way for purposes of explanation only.

With additional reference to FIG. 5B, joint 1 can have a first acceleration profile 503B, joint 2 can have a second acceleration profile 505B, and joint 3 (the end effector) can have a third acceleration profile 507B. Note that the joints closer to the base of the robot arm have higher acceleration limits and lower velocity limits while joints farther away from the base of the robot arm have lower acceleration limits but higher velocity limits. Thus, joint 1 has higher acceleration limits than joint 3 (the end effector) and joint 3 has higher velocity limits than joint 1. The acceleration limit on joint 3, or the end effector, is especially applicable in being able to prevent the substrate from flying off the end effector during robot arm movement execution.

In various embodiments, the motion controller 102 (e.g., the move time minimizer 108) randomly varies the profile move parameters such as the velocity limits (e.g., maximum velocity) and acceleration limits (maximum acceleration) for the velocity profiles of each move of a joint, of the multiple joints, between nearest neighbor reachable positions and through the multiple (shortest) paths. In one embodiment, these velocity profiles are trapezoidal velocity profiles, but other velocity profiles are also envisioned as discussed with reference to FIG. 7B. While this random varying is performed, the motion controller 102 can further verify that the torque limits on the one or more motors that move the robot arm are satisfied in view of the velocity limits and the acceleration limits that are varied. In this way, the motion controller 102 can seek to find an optimum combination where the move is fast while not exceeding torque on motors or acceleration of the end effector. These torque limits can be applicable to each joint individually, for example. In the various embodiments, the motion controller 102 can verify that a maximum acceleration limit of the end effector is also satisfied.

Figure 6:
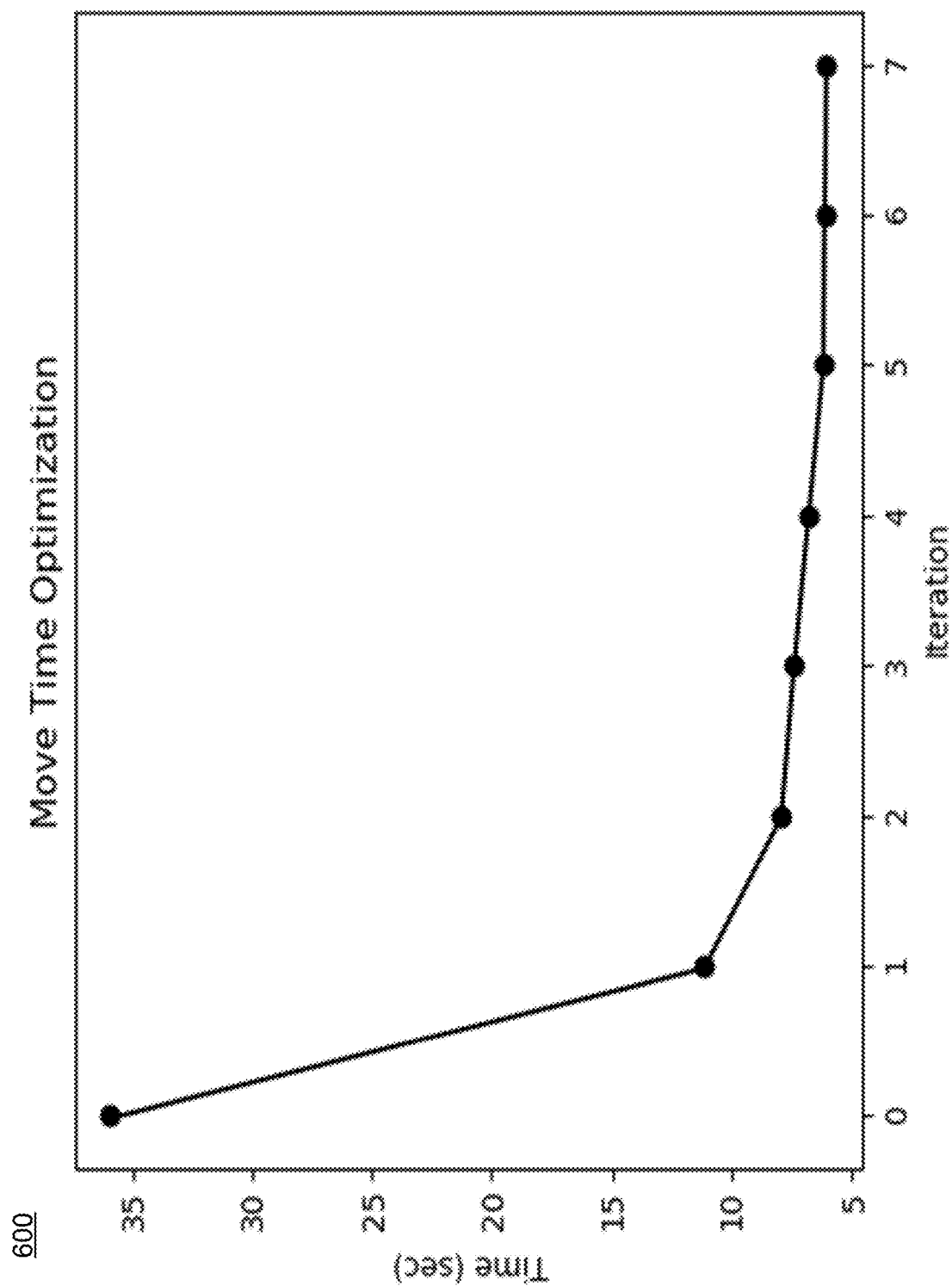
FIG. 6 is a plot of move time optimization in which, after seven iterations, move time of the robot arm is minimized to less than 10 seconds according to an embodiment.

In some embodiments, the motion controller 102 can iteratively perform the random varying of the velocity limits and the acceleration limits for each joint of the multiple joints while keeping track of a shortest move time until convergence on a minimum move time for the first path 315 (FIG. 3). FIG. 6 is a plot 600 of move time optimization in which, after seven iterations, move time of the robot arm is minimized to less than 10 seconds according to an embodiment. The number of iterations and the move time illustrated in the plot 600 are merely by way of example for purposes of explanation, and additional or fewer iterations are envisioned to achieve the same or different shortest move time.

FIG. 7A is a flow chart of a method 700A for determining shortest paths through robot joint space in which multiple joints and an end effector satisfy Cartesian limits, according to various embodiment. The method 700A can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700A is performed by the motion controller 102 (FIG. 1) or other computing system having a processing device. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 710, the processing logic determines, within a joint space of the robot arm, a start point and an end point of one or more end effector for a complete movement of the robot arm to transfer the substrate positioned on the one or more end effector.

At operation 715, the processing logic identifies, from a grid of joint positions within joint ranges of the multiple joints and using a first granularity, multiple reachable positions by the multiple joints and the one or more end effector. The grid is within the joint space and includes the start point and the end point, as discussed with reference to FIG. 3. The first granularity can include, within four to six radians of distance of a joint of the multiple joints, between 7 and 15 reachable positions.

At operation 720, the processing logic builds a graph that includes nodes to represent the multiple reachable positions that also satisfy Cartesian limits of the robot arm within the joint space based on joint position combinations for respective ones of the multiple reachable positions.

At operation 725, the processing logic adds, to the graph, edges that interpolate between nearest neighbor nodes of the nodes that complete multiple paths between the start point and the end point, where the edges also satisfy the Cartesian limits.

At operation 730, the processing logic calculates, by the processing device, distances of the edges of the graph, e.g., using the Euclidean norm between joint position values of the nearest neighbor nodes.

At operation 735, the processing logic executes a graph optimization algorithm (such as the Dijkstra graph algorithm or the A* search algorithm) on the graph to determine one of multiple shortest paths or lowest cost paths through the nodes between the start point and the end point. As discussed, the lowest cost paths can further integrate cost functions (e.g., with weighted paths) into the distance calculations that either reward or penalize different paths depending on the cost functions and various criteria. For example, cost functions reward paths that are especially short and/or straight and penalize paths that are especially long and/or have curvature, and depending on a degree of curvature. Further, cost functions can penalize paths expected to see lower velocity and reward paths expected to see higher velocity. By using different cost functions, the shortest paths closer approximate the shortest paths associated with the shortest move times. Using different cost functions for graph optimization can improve computational efficiency of the second phase (discussed with reference to FIG. 7B) by reducing the number of multiple shortest paths to consider. Some embodiments can skip the seconds phase and directly compute shortest move time.

FIG. 7B is a flow chart of a method 700B for determining over which of the shortest paths (FIG. 7A) that move time can be minimized according to various embodiments. The method 700B can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700B is performed by the motion controller 102 (FIG. 1) or other computing system having a processing device. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 755, the processing logic selects a path (e.g., optimal move path), of the multiple shortest paths, between the start point and the end point that minimizes move time of the primary end effector between the start point and the end point. The processing logic can further direct the robot arm to transfer the substrate using the path through the joint space.

In execution of operation 755, the processing logic, at operation 760, can further randomly vary velocity limits and acceleration limits for velocity profiles of each move of a joint, of the multiple joints, between the nearest neighbor nodes and through the multiple shortest paths. In one embodiment, the velocity profiles are trapezoidal profiles as was discussed with reference to FIGS. 5A-5B. In alternative embodiments, the velocity profiles are SCurve, Jerk limited, Quintic polynomial (QCurve), e.g., $5^{th}$ order polynomial, or the like velocity profiles.

At operation 765, the processing logic verifies that torque limits on one or more motors that move the robot arm are satisfied in view of the velocity limits and the acceleration limits that are varied. These torque limits may apply to the multiple joints, for example. At operation 770, the processing logic verifies that a maximum acceleration limit of the one or more end effector is satisfied.

FIG. 8 is a flow chart of a method 800 of planning and executing a movement of a robot arm over a path through robot joint space that satisfies Cartesian limits and minimizes move time according to various embodiments. The method 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 is performed by the motion controller 102 (FIG. 1) or other computing system having a processing device. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 810, the processing logic determines, within a joint space of the robot arm, a start point and an end point of the one or more end effector for a complete movement of the robot arm to transfer the substrate.

At operation 815, the processing logic builds, with respect to the joint space for the multiple joints and the one or more end effector, a graph of reachable positions and sub-paths between the reachable positions. The reachable positions and the sub-paths satisfy Cartesian limits within the joint space, and the reachable positions are identified at a granularity that divides the complete movement into multiple sub-movements of the robot arm. For example, within four to six radians of distance of a joint of the multiple joints, the granularity of the reachable positions is between 7 and 15 reachable positions.

At operation 820, the processing logic determines, by executing a graph optimization algorithm on the graph, multiple paths, each made up of a group of the sub-paths, that have one of shortest distances or lowest costs between the start point and the end point. Use of different cost functions to determine lowest cost paths was discussed previously.

At operation 825, the processing logic selects a path (e.g., optimal move path), of the multiple paths, through the graph that minimizes move time of the one or more end effector between the start point and the end point while satisfying torque limits on the multiple joints and an acceleration limit on the end effector. In one embodiment, the one or more end effector includes a primary end effector and a passive end effector. Further, to select the path, the processing logic is further to ensure the passive and primary end effectors satisfy acceleration limits while minimizing move time of the primary end effector.

At operation 830, the processing logic optionally direct the robot arm to transfer the substrate using the path through the joint space.

The preceding description sets forth numerous specific details such as examples of specific systems, components, methods, and so forth in order to provide a good understanding of several embodiments of the present disclosure. It will be apparent to one skilled in the art, however, that at least some embodiments of the present disclosure can be practiced without these specific details. In other instances, well-known components or methods are not described in detail or are presented in simple block diagram format in order to avoid unnecessarily obscuring the present disclosure. Thus, the specific details set forth are merely exemplary. Particular implementations can vary from these exemplary details and still be contemplated to be within the scope of the present disclosure.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within ±10%.

Although the operations of the methods herein are shown and described in a particular order, the order of operations of each method can be altered so that certain operations can be performed in an inverse order so that certain operations can be performed, at least in part, concurrently with other operations. In another embodiment, instructions or sub-operations of distinct operations can be in an intermittent and/or alternating manner.

It is understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A system comprising:
   a robot comprising a robot arm having multiple joints and one or more end effector, the one or more end effector to carry a substrate; and
   a processing device coupled to the robot, the processing device to:
   build, with respect to a joint space for the multiple joints and the one or more end effector, a graph of reachable positions and sub-paths between the reachable positions, wherein the reachable positions and the sub-paths satisfy Cartesian limits within the joint space;
   determine, by executing a graph optimization algorithm on the graph, multiple paths, each made up of a group of the sub-paths and having one of a shortest distance or a lowest cost between a start point and an end point of the one or more end effector; and
   select a path, of the multiple paths, through the graph that minimizes a move time of the one or more end effector between the start point and the end point.

2. The system of claim 1, wherein the processing device is further to direct the robot arm to transfer the substrate over the path through the joint space.

3. The system of claim 1, wherein the reachable positions are represented as nodes and the sub-paths between the reachable positions are represented as edges in the graph, and to build the graph, the processing device is further to:
   identify a plurality of nodes, each node being reachable by one of the multiple joints or the one or more end effector and satisfying the Cartesian limits of the robot arm;
   add edges that linearly interpolate between nearest neighbor nodes of the plurality of nodes, wherein each edge also satisfies the Cartesian limits; and
   calculate distances of the edges with which to execute the graph optimization algorithm.

4. The system of claim 1, wherein to minimize the move time of the one or more end effector, the processing device is further to:
   randomly vary velocity limits and acceleration limits for velocity profiles of each move of a joint, of the multiple joints, between nearest neighbor reachable positions and through the multiple paths;
   verify that torque limits on one or more motors that move the robot arm are satisfied in view of the velocity limits and the acceleration limits that are varied; and
   verify that a maximum acceleration limit of the one or more end effector is satisfied.

5. The system of claim 4, wherein the processing device is further to iteratively perform the randomly varying of the velocity limits and the acceleration limits for each joint of the multiple joints while keeping track of a shortest move time until convergence on a minimum move time for the path.

6. The system of claim 1, wherein the processing device is further to:
   identify additional paths of the multiple paths that minimize move time to additional end points; and
   in response to the robot waking up:
   determine a location in the joint space of a primary end effector of the one or more end effector;
   determine a closest of the additional end points to the location;
   select an additional path, of the additional paths, based on the location; and
   direct the robot arm to return to a home position at the start point via the selected additional path.

7. The system of claim 1, wherein the graph optimization algorithm comprises one of the Dijkstra graph algorithm or the A* search algorithm.

8. The system of claim 1, wherein, within four to six radians of distance of a joint of the multiple joints, a granularity of the reachable positions is between 7 and 15 reachable positions.

9. The system of claim 1, wherein the one or more end effector comprises a primary end effector and a passive end effector, and to select the path, the processing device is further to ensure the passive and primary end effectors satisfy acceleration limits while minimizing move time of the primary end effector.

10. A method comprising:
building, with respect to a joint space for multiple joints and one or more end effector of a robot arm, a graph of reachable positions and sub-paths between the reachable positions, wherein the reachable positions and the sub-paths satisfy Cartesian limits within the joint space;
determining multiple paths through the graph by executing, with a processing device, a graph optimization algorithm on the graph, wherein each path of the multiple paths comprises a group of the sub-paths and has one of a shortest distance or a lowest cost between a start point and an end point of the one or more end effector; and
selecting a path, of the multiple paths, through the graph that minimizes a move time of the one or more end effector between the start point and the end point.

11. The method of claim 10, further comprising directing the robot arm to transfer a substrate on the one or more end effector over the path through the joint space.

12. The method of claim 10, wherein the reachable positions are represented as nodes and the sub-paths between the reachable positions are represented as edges in the graph, and building the graph further comprises:
identifying a plurality of nodes, each node being reachable by one of the multiple joints or the one or more end effector and satisfying the Cartesian limits of the robot arm;
adding edges that linearly interpolate between nearest neighbor nodes of the plurality of nodes, wherein each edge also satisfies the Cartesian limits; and
calculating distances of the edges with which to execute the graph optimization algorithm.

13. The method of claim 10, wherein to minimize the move time of the one or more end effector, the method further comprising:
randomly varying velocity limits and acceleration limits for velocity profiles of each move of a joint, of the multiple joints, between nearest neighbor reachable positions and through the multiple paths;
verifying that torque limits on one or more motors that move the robot arm are satisfied in view of the velocity limits and the acceleration limits that are varied; and
verifying that a maximum acceleration limit of the one or more end effector is satisfied.

14. The method of claim 13, further comprising iteratively performing the randomly varying of the velocity limits and the acceleration limits for each joint of the multiple joints while keeping track of a shortest move time until convergence on a minimum move time for the path.

15. The method of claim 10, further comprising:
identifying additional paths of the multiple paths that minimize move time to additional end points; and
in response to the robot waking up:
determining a location in the joint space of a primary end effector of the one or more end effector;
determining a closest of the additional end points to the location;
selecting an additional path, of the additional paths, based on the location; and
directing the robot arm to return to a home position at the start point via the selected additional path.

16. The method of claim 10, wherein the graph optimization algorithm comprises one of the Dijkstra graph algorithm or the A* search algorithm.

17. The method of claim 10, wherein, within four to six radians of distance of a joint of the multiple joints, a granularity of the reachable positions is between 7 and 15 reachable positions.

18. The method of claim 10, wherein the one or more end effector comprises a primary end effector and a passive end effector, and selecting the path further comprising ensuring the passive and primary end effectors satisfy acceleration limits while minimizing move time of the primary end effector.

19. A non-transitory computer-readable medium storing instructions, which when executed by a processing device, cause the processing device to execute a plurality of operations comprising:
building, with respect to a joint space for multiple joints and one or more end effector of a robot arm, a graph of reachable positions and sub-paths between the reachable positions, wherein the reachable positions and the sub-paths satisfy Cartesian limits within the joint space;
determining multiple paths through the graph by executing a graph optimization algorithm on the graph, wherein each path of the multiple paths comprises a group of the sub-paths and has one of a shortest distance or a lowest cost between a start point and an end point of the one or more end effector; and
selecting a path, of the multiple paths, through the graph that minimizes a move time of the one or more end effector between the start point and the end point.

20. The non-transitory computer-readable medium of claim 19, wherein the plurality of operations further comprise directing the robot arm to transfer a substrate on the one or more end effector over the path through the joint space.

* * * * *